(12) United States Patent
Miller et al.

(10) Patent No.: US 10,963,703 B2
(45) Date of Patent: Mar. 30, 2021

(54) METHODS AND SYSTEMS FOR ADAPTABLE TARGETING OF AN OBJECT OR EVENT

(71) Applicant: SMART INFORMATION FLOW TECHNOLOGIES LLC, Minneapolis, MN (US)

(72) Inventors: Christopher Allan Miller, Saint Paul, MN (US); Joshua David Hamell, San Marcos, CA (US); Jeremy Frank Gottlieb, Saint Paul, MN (US)

(73) Assignee: Smart Information Flow Technologies LLC, Minneapolis, MN (US)

( * ) Notice: Subject to any disclaimer, the term of this patent is extended or adjusted under 35 U.S.C. 154(b) by 344 days.

(21) Appl. No.: 16/020,561

(22) Filed: Jun. 27, 2018

(65) Prior Publication Data
US 2020/0005049 A1  Jan. 2, 2020

(51) Int. Cl.
*G06K 9/00* (2006.01)
*G06K 9/62* (2006.01)
*B64C 39/02* (2006.01)

(52) U.S. Cl.
CPC ......... *G06K 9/00771* (2013.01); *G06K 9/627* (2013.01); *G06K 9/628* (2013.01); *B64C 39/024* (2013.01); *B64C 2201/123* (2013.01)

(58) Field of Classification Search
CPC ............ B64C 2201/123; B64C 39/024; G06K 9/00369; G06K 9/00771; G06K 9/627; G06K 9/628
USPC ...... 702/188, 189; 342/36, 96; 382/115, 118
See application file for complete search history.

(56) References Cited

U.S. PATENT DOCUMENTS

| | | | |
|---|---|---|---|
| 5,798,942 A * | 8/1998 | Danchick | G01S 3/7864 342/36 |
| 2013/0266193 A1* | 10/2013 | Tiwari | G06F 16/5854 382/115 |
| 2018/0107880 A1* | 4/2018 | Danielsson | G06K 9/00268 |

OTHER PUBLICATIONS

Defense Science Board. "The Role of Autonomy in DoD Systems." Report of the Defense Science Board, Office of the Undersecretary of Defense for Acquisition, Technology and Logistics. Jul. 17, 2012 (7 pages).
Blackhurst, J.L., Gresham, J.S., & Stone, M.O. "The quantified warrior: How DoD should lead human performance augmentation," The Armed Forces Journal, Dec. 1, 2012 (10 pages).

(Continued)

*Primary Examiner* — John H Le
(74) *Attorney, Agent, or Firm* — JoAnn M. Seaton; Griffiths & Seaton PLLC

(57) ABSTRACT

Methods, systems, and computer program products for identifying a desired target from among a more general class(es) of objects are provided. A method includes receiving one or more sensor feeds including one or more objects that are identified as being from the same class of objects, scanning the one or more objects to determine if a desired target is among the one or more objects based on a target profile, and identifying the desired target if the target profile matches one or more characteristics of a particular object in the one or more objects. One system includes a sensing device in communication with a hardware processor in which the hardware processor is configured for performing the above method. A computer program product includes computer code for performing the above method when a hardware processor executes the computer code.

19 Claims, 7 Drawing Sheets

(56) References Cited

OTHER PUBLICATIONS

Drew, C. "Military is Awash in Data from Drones". New York Times, Jan. 10, 2010. Downloaded at http://www.nytimes.com/2010/01/11/business/11drone.html?pagewanted=all (5 pages).

Patzek, M., Zimmer, D., Feitshans G., Whalen, J., Squire M., Hughes, T., and Flach, J. "Multi-UAV control inter-face technology." 711th HPW. Dayton, OH. Sep. 2012 (58 pages).

Miller, C. and Parasuraman, R. "Designing for Flexible Interaction between Humans and Automation: Delegation Interfaces for Supervisory Control." Human Factors, vol. 49, No. 1 pp. 57-75, Feb. 2007 (19 pages).

Parasuraman, R., Galster, S., Squire, P., Furukawa, H. and Miller, C. "A Flexible Delegation-Type Interface Enhances System Performance in Human Supervision of Multiple Robots: Empirical Studies with RoboFlag." IEEE Systems, Man and Cybernetics—Part A, Special Issue on Human-Robot Interactions, vol. 35 No. 4, 481-493 Jul. 2005 (14 pages).

Fern, L., & Shively, R. J. A Comparison of Varying Levels of Automation on the Supervisory Control of Multiple UASs. In Proceedings of AUVSI's Unmanned Systems, North America, Washington, D.C. Aug. 2009 (12 pages).

Goldman, Robert P., Karen Zita Haigh, David J. Musliner, and Michael JS Pelican. "MACBeth: A Aulti-Agent Constraint-Based Planner," in Working Notes of AAI-2000 Wkshp on Constraints and AI Planning. Tech Rpt WS-00-02, 11-17, AAAI Press, Austin, TX. 2000 (15 pages).

Hughes, T. C., Flach, J. K., Squire, M. P., Whalen, J., Zimmer, D. J., Patzek, M. J., & Miller, B. A. "Multi-UAV Supervisory Control Interface Technology (MUSCIT)" (No. AFRL-RH-WP-TR-2012-0129). 711th HPW, Dayton OH, Sep. 2012 (58 pages).

Treisman, Anne M., & Gelade, Garry. "A Feature-Integration Theory of Attention." Cognitive Psychology. 12, 97-136. 1980 (40 pages).

Miller, C., Shaw, T., Hamell, J., Emfield, A., Musliner, D., de Visser, E., and Parasurman, R. "Delegation to Automation: Performance and Implications in Non-optimal Situations." D. Harris (Ed.): Engin. Psychol. and Cog. Ergonomics, HCII 2011, LNAI 6781, pp. 322-331, Jul. 2011. (11 pages).

Goldman, R., Miller, C., Wu, P., Funk, H., and Meisner, J. "Optimizing to Satisfice: Using Optimization to Guide Users." AHS International Specialists' Meeting on Unmanned Rotorcraft, Phoenix, AZ, Jan. 2005 (10 pages).

Miller, C., Pelican, M., and Goldman, R. "'Tasking'" Interfaces to Keep the Operator in Control. Apr. 30, 2000 (5 pages).

Wu, Peggy et al., U.S. Appl. No. 15/009,379, filed Jan. 28, 2016 (36 pages).

Gottlieb, J., Graham, R., Maughan, T., Py, F., Elkaim, G., & Rajan, K. "An Experimental Momentum-Based Front Detection Method for Autonomous Underwater Vehicles." In Proceedings of the IEEE Conference on Robotics and Automation. St. Paul, MN, May 14-18, 2012 (6 pages).

Gottlieb, J. F. (2005). "The Structure of Semantic Memory: Category-Based vs. Modality-Based." In Annual Meeting of the Cognitive Science Society, Stressa, Italy, 2005 (6 pages).

Zeh, J., Birkmire, B., Clive, P., Johnson, J., Krisby, A., Marjamaa, J., Mikios, L., Moss, M., Yallaly, S. "Ad-vanced Framework for Simulation, Integration and Modeling (AFSIM)." Boeing Company Technical Report Down-loaded at http://www.ndia.org/Divisions/Divisions/SystemsEngineering/Documents/NDIA-SE-MS_2014-08-19_Zeh-Birkmire.pdf on Feb. 22, 2015 (5 pages).

Warwick, G. (2013). "AUVSI—Precision Agriculture will lead Civil UASs." Things With Wings Commercial Aviation Blog. Downloaded on Jan. 21, 2014 (4 pages).

"Snapshot: The Global Market for Unmanned Aerial Vehicles iCD Research," Downloaded from http://www.airforce-technology.com/features/feature125724/ on Aug. 1, 2011 (15 pages).

\* cited by examiner

METHODS AND SYSTEMS FOR ADAPTABLE TARGETING OF AN OBJECT OR EVENT

STATEMENT REGARDING FEDERALLY SPONSORED RESEARCH OR DEVELOPMENT

This invention was made with government support under contract number FA8650-14-M-6553 awarded by the United States Air Force Research Laboratory. The government has SBIR data rights, as defined in the FARS, in the invention.

BACKGROUND OF THE INVENTION

In recent years, the use of unmanned vehicles or drones has increased significantly. During operation, the user of an unmanned vehicle controls the unmanned vehicle from a remote location. That is, the user is able to control the movements of the unmanned vehicle via a controller and usually a screen.

An advantage of using an unmanned vehicle instead of a manned vehicle is the ability of the unmanned vehicle to enter dangerous environments without risking the life of the human operator. In addition, without the need of a human occupying the unmanned vehicle, the unmanned vehicle is able to have a smaller size than the equivalent manned vehicle.

Most of the recent developments in human interaction with unmanned vehicles have largely been related to automation control (e.g., navigation and auto-piloting behaviors) or other functions more pertinent to the pilot role of the unmanned vehicles. In other words, other automated functions related to, for example, automated target recognition, discrimination, and tracking have largely been unaddressed. That is, previous unmanned vehicles heavily rely on human eyes to identify and track targets of interest.

SUMMARY

Various embodiments provide methods, systems, and computer program products for identifying a target, such as an object and/or event. One method comprises receiving, by a hardware processor from a sensing device in communication with the hardware processor, one or more sensor feeds comprising one or more objects or events that are identified as being from the same class of objects or events and scanning, by the hardware processor, the one or more objects or events to determine if a target is among the one or more objects or events based on a target profile. The method further comprises identifying the target if the target profile matches one or more characteristics of a particular object or event in the one or more objects or events.

A system comprises a sensing device and a hardware processor coupled to the sensing device. In various embodiments, the hardware processor is configured for receiving, from the sensing device, one or more sensor feeds comprising one or more objects or events that are identified as being from the same class of objects, scanning the one or more objects or events to determine if a target is among the one or more objects or events based on a target profile, and identifying the target if the target profile matches one or more characteristics of a particular object or event in the one or more objects or events.

One computer program product comprises computer code for receiving, by a hardware processor from a sensing device in communication with the hardware processor, one or more sensor feeds comprising one or more objects or events that are identified as being from the same class of objects or events and computer code for scanning, by the hardware processor, the one or more objects or events to determine if a target is among the one or more objects or events based on a target profile. The computer program product further comprises computer code for identifying the target if the target profile matches one or more characteristics of a particular object or event in the one or more objects or events.

BRIEF DESCRIPTION OF THE DRAWINGS

So that the advantages of the invention are readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

The illustrated embodiments below provide methods, systems, and computer program products for identifying a target. The various embodiments provide a style of automation referred to as adaptable because the automation relies on and/or facilitates a user's expressions of intent. The user's intent is expressed across a flexible range of authority and tasking levels in a manner that is similar to person-to-person delegation relationships. That is, the delegation relationship facilitates situational awareness of what the subordinate (e.g., an unmanned vehicle) is doing by providing an explicit, declared intent against which to evaluate the subordinate's performance.

The following detailed description should be read with reference to the drawings, in which like elements in different drawings are numbered in like fashion. The drawings depict selected embodiments and are not intended to limit the scope of the invention. Those skilled in the art will recognize that many of the examples provided may have suitable alternatives that can be utilized without departing from the spirit of the invention.

Figure 1:
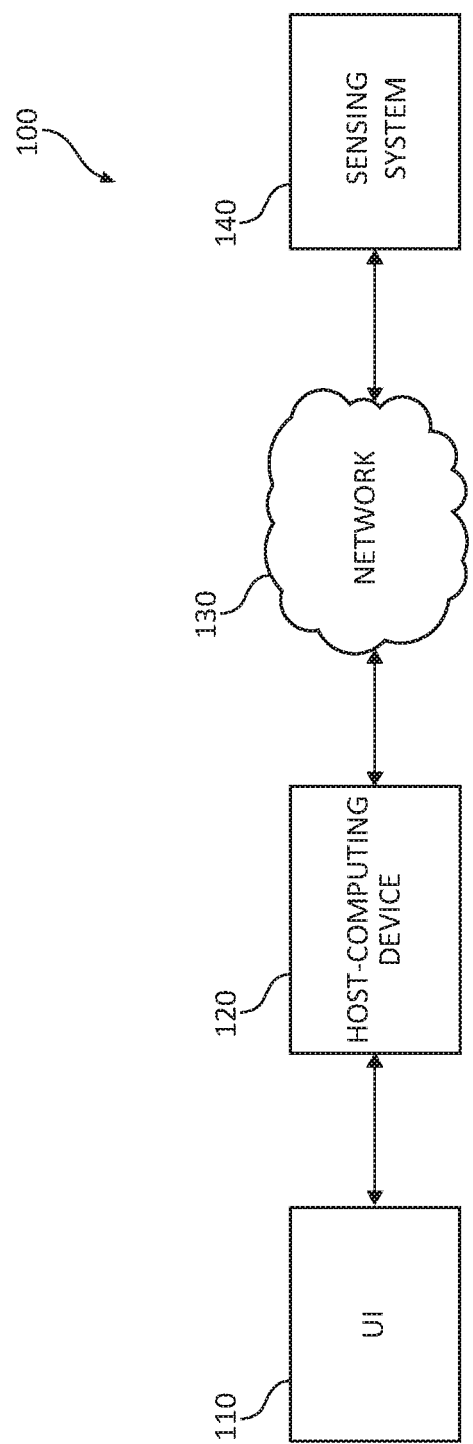
FIG. 1 is a block diagram of one embodiment of a system for identify and tracking one or more targets.

Turning now to the figures, FIG. 1 is a diagram of one embodiment of a system 100 for identifying a target. System 100, at least in the illustrated embodiment, comprises a user interface (UI) 110, a host-computing device 120, a network 130, and a sensing system 140 coupled to and communication with one another.

UI 110 may be any user interface known in the art or developed in the future that enables a user to provide inputs for interacting with, monitoring, and/or controlling sensing system 140. Examples of UI 110 include, but are not limited to, a touchscreen, a keyboard, a computer mouse, one or more buttons, one or more knobs, one or more switches, one or more sliders, one or more joysticks, gesture-input interface, voice-input interface, motion-tracking interface, and the like user interfaces. In some embodiments, UI 110 is a combination of two or more of the touchscreen, the keyboard, the computer mouse, button(s), knob(s), switch(es), slider(s), joystick(s), gesture-input interface, voice-input interface, motion-tracking interface, and the like user interfaces. In one embodiment, UI 110 is a combination of at least a touchscreen (or video screen) and a joystick.

In various embodiments, UI 110 is configured to present to the user options for selecting an object to be a potential target based on general categories and/or prototypes, as discussed below with reference to target profile module 1430 in FIG. 2. In one embodiment, UI 110 is further configured for receiving from the user one or more refinements to the selected object to narrow one or more characteristics of the selected object to better define a target, also discussed below with reference to target profile module 1430 in FIG. 2. As illustrated in FIG. 1, UI 110 is coupled to and in communication with host-computing device 120.

Host-computing device 120 may be any suitable computing device known in the art or developed in the future that is capable of receiving inputs from UI 110 and providing those inputs to sensing system 140. That is, host-computing device 120 may be a portion of and/or be in combination with a server, a desktop computer, a laptop computer, a tablet, a smartphone, and the like computing devices. As illustrated in FIG. 1, host-computing device 120 communicates with sensing system 140 via network 130.

Network 130 may be any suitable wired and/or wireless network known in the art or developed in the future that enables host-computing device 120 to communicate with sensing system 140. Examples of network 130 include, but are not limited to, a local area network (LAN), a wireless local area network (WLAN), a wide area network (WAN), the Internet, personal area network (PAN), enterprise private network (EPN), virtual private network (VPN), metropolitan area network (MAN), and the like networks.

Figure 2:
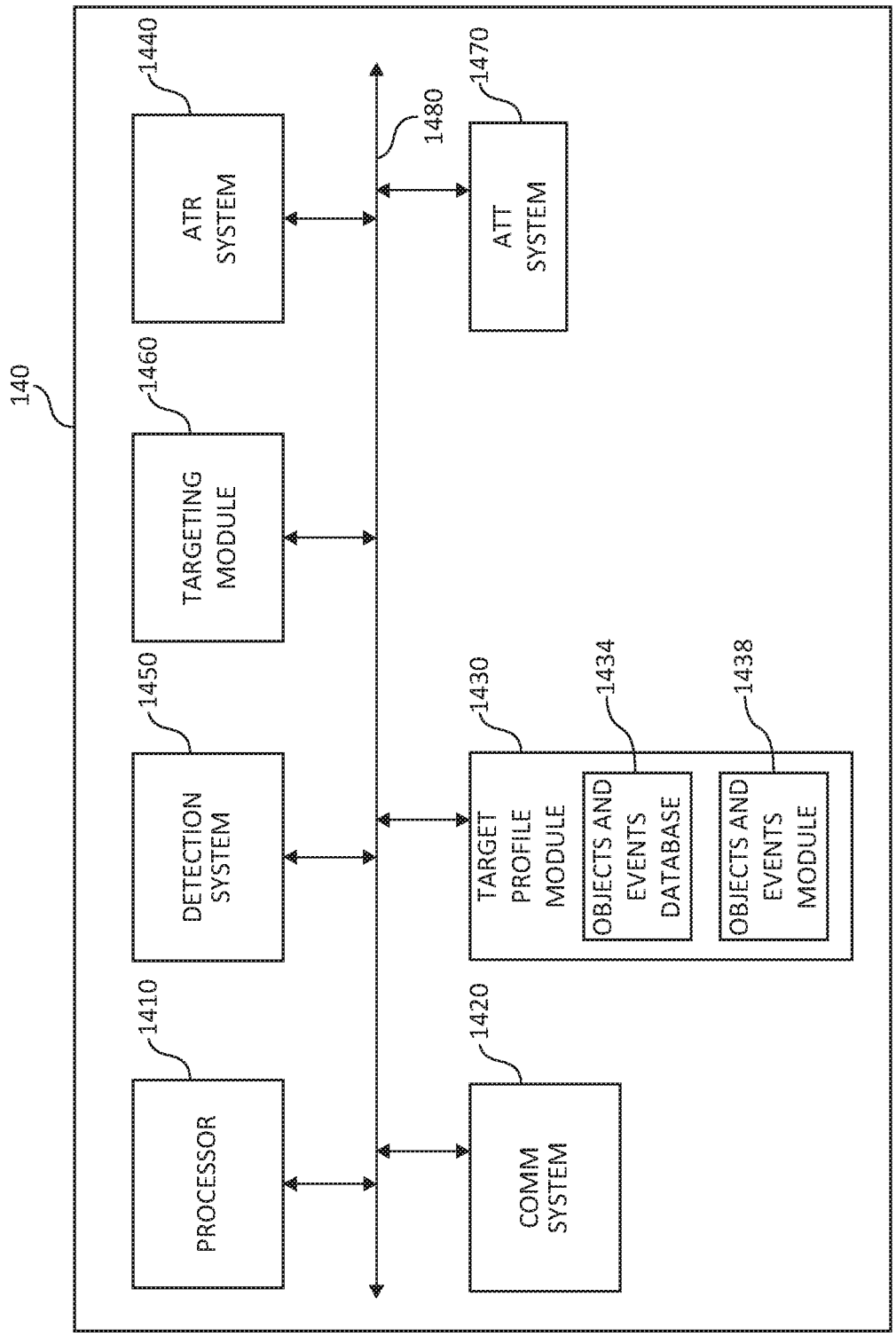
FIG. 2 is a block diagram of one embodiment of an unmanned vehicle included in the system of FIG. 1.

FIG. 2 is a block diagram of one embodiment of sensing system 140. The illustrated embodiment of sensing system 140 comprises a processor 1410, a communication system 1420, a target profile module 1430, an automated target recognition (ATR) system 1440, a detection system 1450, a targeting module 1460, and an automated target tracking (ATT) system 1470 coupled to and in communication with each other via a bus 1480 (e.g., a wired and/or wireless bus).

Processor 1410 may be any suitable computer-processing device known in the art or developed in the future. That is, processor 1410 is configured for executing and/or communicating with communication system 1420, target profile module 1430, ATR system 1440, detection system 1450, targeting module 1460, and ATT system 1470.

Communication system 1420 may be any suitable type of device and/or system known in the art or developed in the future enabling sensing system 140 to communicate with host-computing device 120 (and UI 110). That is, communication system 1420 is configured to send communication signals to and to receive communication signals from host-computing device 120 (and UI 110) via network 130 to assist in generating a target profile in target profile module 1430.

Target profile module 1430, in various embodiments, comprises an objects and events database 1434 and/or an objects and events module 1438 that enables the user to generate a profile of a target of interest to at least assist in identifying, recognizing, and tracking one or more specific targets. While described as being an object and events database 1434 and an objects and events module 1438 since typically both objects and events are defined by object and events database 1434 and/or used to define a profile in objects and events module 1438, in one embodiment, object and events database 1434 may only store only one of objects or events and/or objects and events module 1438 may define the profile of the target using only one of objects and events.

In various embodiments, objects and events database 1434 comprises one or more general categories or prototypes of one or more objects and/or events capable of becoming the target of interest. For example, objects database 1434 may include such general categories as: terrestrial vehicles, persons, aircraft, aquatic vessels, buildings, and/or the like general categories. In one embodiment, the general categories or prototypes of one or more objects and/or events capable of becoming the target of interest, as well as any addition description thereof, is, at least in part, dictated by the detection capabilities of the ATR system 1440 and/or ATT system 1470 included in sensing system 140.

In at least some embodiments, objects and events database 1434 includes further refinements and/or options to the general category. For example, under the general category of "terrestrial vehicles," objects and events database 1434 may include the options of selecting an automobile, a truck, a motorcycle, a bicycle, various types of military vehicle (e.g., a tank, high mobility multipurpose wheeled vehicle commonly known as a Humvee, armored personal carrier commonly known as APC, etc.), and/or the like terrestrial vehicles. In another example, objects and events database 1434 may include the general category of "person." As one skilled on the art will appreciate, the number of general categories is numerous and the various embodiments discussed herein contemplate all such embodiments, options, and/or categories.

Objects and events module 1438, in various embodiments, is configured to receive target-specific inputs from the user to generate a profile of a specific target or specific object and/or event of interest. In one embodiment, to generate the profile, objects and events module 1438 is configured to receive the selected object and/or event from objects and events database 1434 and merge the target-specific inputs received from the user with the object and/or event selected from objects and events database 1434. The user inputs may be preset options and/or options that the user may add on a case-by-case basis.

In various other embodiments, one or more attributes of the target may be obtained directly from ATR system 1440, targeting module 1460, and/or ATT system 1470, as discussed below. In other words, ATR system 1440, targeting module 1460, and/or ATT system 1470 includes the ability to communicate to the user (via UI 110) "that object, right there is what I want to track," for example, by pointer, mouse clicks, bounding box, or other suitable indicator, and have a target profile auto-created for that object with whichever object class and attributes can be derived from the sensor feedback and the processing by ATR system 1440, targeting module 1460, and/or ATT system 1470. For example, ATR system 1440, targeting module 1460, and/or ATT system 1470 collectively "know" that the target (e.g., a human) indicated by the user is a member of the "human" class, his/her height, the colors of various portions of his/her body, and possibly something about his/her current behavior (e.g., moving vs. stationary), etc. Thus, ATR system 1440, targeting module 1460, and/or ATT system 1470 can build a "target profile" from whatever ATR system 1440, targeting module 1460, and/or ATT system 1470 is currently detecting and save the target profile for later use.

In one embodiment, objects and events module 1438 comprises refinement options to the one or more categories discussed above with reference to objects and events database 1434. For example, under the "automobile" option in the "terrestrial vehicle" category, the user may be able to select make, model, color, and/or other general identifiers of an automobile. Similarly, under the "military vehicle" option in the "terrestrial vehicle" category, the user may be able to select a type of military vehicle (e.g., a tank, an armored transport, etc.), color, symbols, and/or other identifiers of a military vehicle. In addition, specific attributes of a specific entity and/or object may be included, such as, the color of a hat a person is wearing, or the fact that a white pickup truck has a dented left fender and a blue hood.

In a similar example for a person, objects and events module 1438 may include options for civilian/military personnel, occupation/uniform/clothing, hair color, nationality, height ranges, weight ranges, age ranges, and/or the like identifying features/characteristics that are identifiable by the particular ATR system 1440 and/or ATT system 1470 included in sensing system 140. In one embodiment, the identifying features and/or characteristics available for selection in the objects or events module 1438 are dictated by the capabilities of the ATR system 1440 and/or ATT system 1470 included in sensing system 140. In one example, at least a portion of the selected objects and/or events collectively define a behavior of a target, where the target is a person or a group of persons. As such, the profile of a target may include defined behaviors characteristic of and/or expected by the target.

In other embodiments, objects and events module 438 comprises conjunction options and/or disjunction options to the one or more categories discussed above with reference to objects and events database 1434 and/or the further refined options discussed above with reference to objects and events module 1438. Specifically, and in the case of conjunction options, the user is able to input one or more objects and/or events that are normally and/or may be normally associated with the target of interest and that better enables identification of the target of interest. For example, objects and events module 1438 is able to create a profile of a person that is wearing a particular uniform (e.g., an enemy uniform) in conjunction with a particular type of vehicle (e.g., a blue truck) and/or that moves or acts in a certain way (e.g., is carrying a briefcase, is checking a mobile phone, and/or is moving west). Thus, the resulting profile of the target is one or more persons wearing the enemy uniform, in the vicinity of one or more blue trucks, and/or walks with a distinctive left leg limp.

In addition, various embodiments include "squirter detector" options for inclusion in the target profile. Squirter detector options relate to a specific instance of behavioral conjunction, such as temporal and/or spatial components (e.g., actions) associated with a number of detected objects leaving a common place or thing either simultaneously and/or in close temporal proximity to one another. Examples, of a squirter detector include multiple individuals or entities leaving a building, car, boat, or other location or object, perhaps at a common speed, substantially simultaneously following an event. In one example, the target profile may include other definitions of the time or place of actions in correspondence with a person, place, or occurrence, such as adding to the above enemy uniform and blue truck example profile that the person(s) wearing the enemy uniform exiting the blue truck and/or approaching the blue truck.

In the case of disjunction options, the user is able to input one or more objects or events that would not normally be associated with the target of interest and that better enables identification of the target of interest. For example, objects and events module 1438 is able to create a profile of a person or persons that are exiting a building except those persons wearing blue uniforms. Thus, the resulting profile of the target is one or more persons not wearing a blue uniform exiting a building.

In other embodiments, objects and events module 1438 includes one or more screen region options. That is, the user is able to input one or more regions of interest related to a particular type of object or event and objects and events module 1438 automatically returns objects similar to the particular type of object or event with the one or more various different regions of interest.

For example, the user is interested in locating/identifying and/or tracking persons wearing a hat or head covering and inputs such into objects and events module 1438. In response thereto, objects and events module 1438 populates the profile of an individual with a hat and/or head covering.

Figure 3:
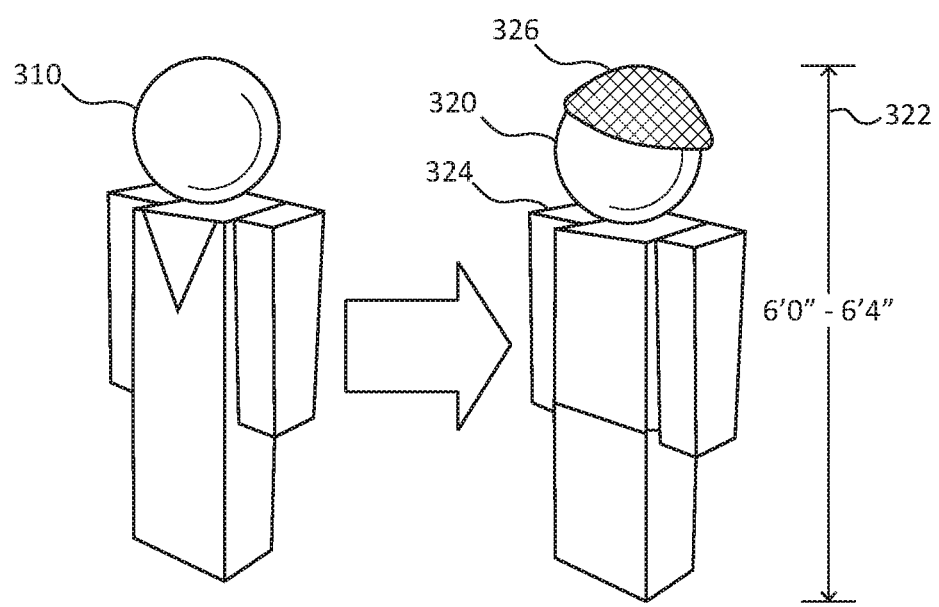
FIG. 3 is a diagram illustrating one embodiment of generating a target profile for a target.

In one non-limiting example with reference to FIG. 3 and in which the object or event is an object or, more particularly, the object or event is a person 310 with a red hat, objects and events module 1438 receives from the user an input that the target is a 6'2" person of a particular group known for wearing a white uniform and the particular individual is also wearing a red hat. Objects and events module 1438 merges this input from the user with the person 310 that the user selected/generated from objects and events database 1434 to generate a profile 320 of an individual with the general characteristics from objects and events database 1434 and the specific characteristics received from the user. Specifically, the user selected person 310 from objects and events database 1434 and added that the specific person has a height in the range of about 6'0" to about 6'4" and wears a white uniform with a red hat (or typically wears a white uniform with a red hat) to objects and events module 1438. Here, the profile 320 generated/merged from the inputs to objects and events database 1434 and objects and events module 1438 includes a person with a height 322 in the range of about 6'0" to about 6'4" wearing a white uniform 324 and a red hat 326.

Figure 4:
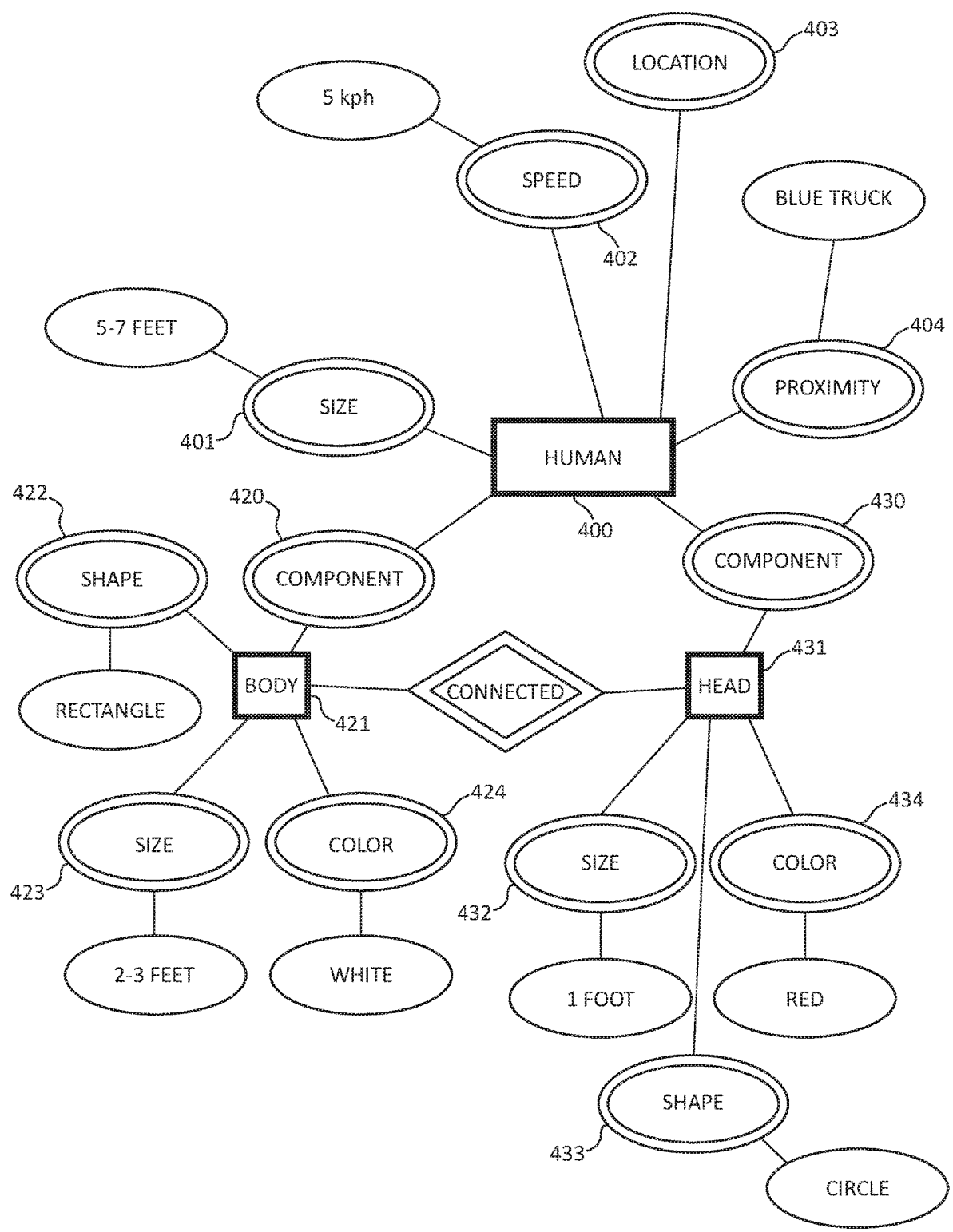
FIG. 4 is a diagram illustrating one embodiment of a semantic network utilized to generate a target profile.

With reference now to FIG. 4, FIG. 4 is a diagram illustrating one embodiment of a semantic network utilized to generate a target profile (e.g., the person illustrated in FIG. 3). Here, the general category is a person or person 400, which automatically generates characteristics related to size 401 (e.g., 5-7 feet), speed 402 (e.g., 5 KPH), location 403, and proximity to conjunctive objects or events 404 (e.g., blue truck). In addition, FIG. 4 illustrates that person 400 includes a component 420 related to the profile of the body 421 of person 400 connected to a component 430 related to the profile of the head 431 of person 400. Body 421 includes characteristics related to shape 422 (e.g., rectangular), size range 423 (e.g., 2-3 feet), and color 424 (e.g., white clothing). Similarly, head 431 includes characteristics related to size 432 (e.g., 1 foot), shape 433 (e.g., circle), and color 434 (e.g., red hat). As discussed further below, the target profile generated by target profile module 1430 is transmitted to detection system 1450 and/or targeting module 1460 after creation.

With reference again to FIG. 2, ATR system 1440 may be any suitable type of manual and/or automated sensor, device, and/or system known in the art or developed in the future for enabling processor 1410 and/or the user (via host-computing device 120 communicating with processor 1410) to sense, detect, and/or determine the presence of one or more objects in an environment in which ATR system 1440 has contact. The object(s) may be stationary objects (e.g., a building, a bunker, etc.) or mobile objects (e.g., one or more persons, one or more vehicles, one or more aircraft, one or more ships/boats, etc.). ATR system 1440, in one embodiment, is a visual system comprising video and/or photo components to identify the object(s). In other embodiments, ATR system 1440 includes one or more thermal imaging components for detecting the object(s) using the heat signature of the object(s). In still other embodiments, ATR system 1440 includes one or more wave components (e.g., RADAR, SONAR, LIDAR, and/or the like wave components) and/or one or more audio components (e.g., a microphone and/or the like audio components) to detect the object(s) via sound and/or light waves. In yet other embodiments, ATR system 1440 includes one or more components for detecting the object(s) utilizing the vibration signature and/or the speed/velocity of the object(s).

In various embodiments, ATR system 1440 is configured to generate one or more sensor feeds that identify the type of object(s) that ATR system 1440 detects in an environment and transmit the sensor feeds including the identified objects to detection system 1450. In one embodiment, the one or more sensor feeds are live sensor feeds and/or sensor feeds generated in real time. In another embodiment, the one or more sensor feeds are hypothetical sensor feeds and/or potential sensor feeds.

For example, ATR system 1440 may be a live-streaming video system and conclude that a grouping of pixels in the video feed represents a crowd of people. Furthermore, ATR system 1440 is configured to transmit the video feed to detection system 1450 and/or targeting module 1460 as one or more sensor feeds and provide notice to detection system 1450 and/or targeting module 1460 that the grouping of pixels that ATR system 1440 currently detects represents several individual people. Upon receipt of the one or more sensor feeds from ATR system 1440, detection system 1450 further processes the sensor feeds to detect one or more characteristics in the particular objects identified by ATR system 1440 (i.e., individual persons in this example).

Detection system 1450, in various embodiments, is configured for receiving the sensor feed(s) from ATR system 1450. Detection system 1450 is further configured for identifying, matching, and/or recognizing one or more additional characteristics of interest the objects identified by ATR system 1440 that are similar to characteristics included in the target profile. The characteristics included in the profile of the target(s) inform detection system 1450 about the size, shape, movement capabilities, the propensity to change (e.g., change from different angles, change in different contexts, change in circumstances (e.g., the "target color" of a person target can change more rapidly than the color of a truck since persons can change body covering/clothing more rapidly than the truck can be painted), etc.) and/or predilections of the objects in the sensor feeds that are candidates for being a target.

For example and in the case of a video feed, detection system 1450 is capable of identifying colors of pixels that may be located at the top of a person that may indicate the presence or non-presence of a hat of a particular color, pixels located in the middle of the person that may indicate the presence or non-presence of a shirt, jacket, uniform, or coat of a particular color, pixels located toward the bottom of the person that may indicate the presence or non-presence of a skirt, pants, shorts, or dress of a particular color, and/or pixels located toward the bottom of the person that may indicate the presence or non-presence of footwear. Similarly, detection system 1450 may be able to use a detected amount of heat from a rear portion of a terrestrial vehicle to identify the vehicle as a large automobile or heat from a position high above the terrestrial vehicle to identify the vehicle as a semi-truck.

Upon detecting characteristics in the sensor feeds from ATR system 1440, detection system 1450 transmits the detected potential target(s) identified in the sensor feed(s) to targeting module 1460 for verification. Notably, while detection system 1450 and targeting module 1460 are described here as separate entities, various embodiments merged detection system 1450 and targeting module 1460 into a single entity.

Targeting module 1460, in various embodiments, is configured for identifying, recognizing, and/or verifying that one or more targets are indeed present in the sensor feeds generated by ATR system 1440 and as further refined by detection system 1450. Targeting module 1460, in various embodiments, utilizes the target profile generated by objects and events database 1434 and/or objects and events module 1438 to search, sense, identify, and/or verify the presence of one or more targets in the sensor feed(s). That is, targeting module 1460 is capable of adaptively and/or semi-autonomously searching, sensing, identifying, and/or verifying the one or more targets in the sensor feed(s) without the need of substantial intervention or assistance from the user and/or other entity. Since targeting module 1460 operates semi-autonomously (e.g., is capable of searching, sensing, and/or identifying the one or more possible targets without the need of substantial intervention from the user and/or other entity), the user is less responsible for identifying targets than in previous systems. In addition, with the use of the one or more target profiles generated by target profile module 1430, targeting module 1460 provides a faster and/or more efficient way to identify, locate, and/or verify targets while still allowing for flexibility (e.g., via objects and events module 1438) in utilizing specific characteristics of a particular target or object of interest to further pinpoint the target(s) and/or object(s) of interest when dispersed amongst similar objects.

Figure 5:
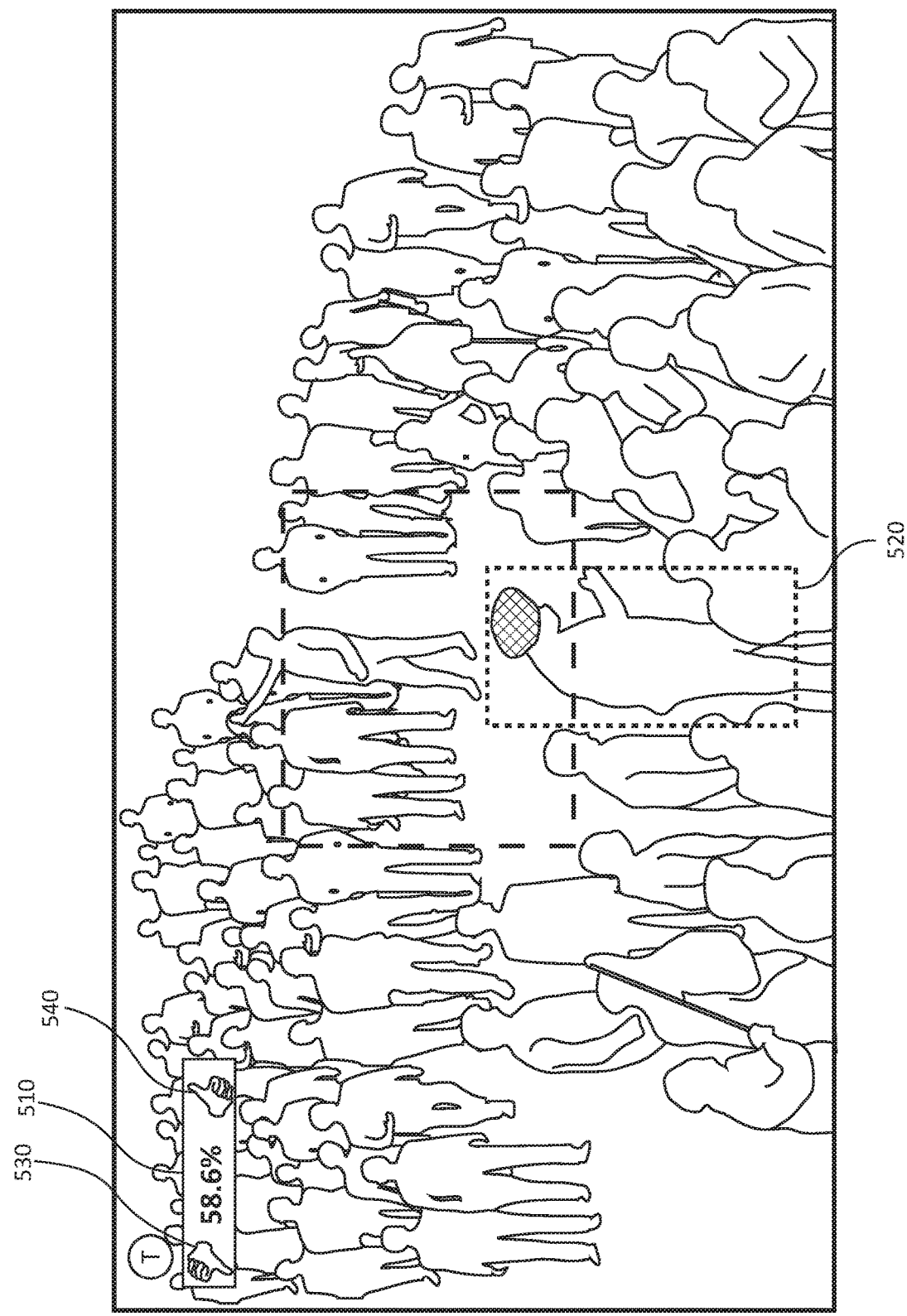
FIG. 5 is a diagram illustrating one embodiment of a scene identifying a potential target.

In one embodiment, targeting module 1460 is configured for providing a confidence estimate 510 of the target to the user (see FIG. 5). That is, targeting module 1460 is configured for assigning a value (e.g., a percentage) to the target based on the degree to which a potential target matches the profile of the target/object of interest.

In addition, in at least some embodiments, targeting module 1460 is configured for highlighting for the user the potential target(s)/object(s) of interest in the sensor feed(s) from ATR system 1440. The potential target(s)/object(s) of interest may be highlighted in any manner known in the art or developed in the future that distinguishes the potential target(s)/object(s) of interest of other objects that are similar to the potential target(s)/object(s) of interest. In one embodiment, targeting module 1460 is configured for drawing a highlighted box 520 (e.g., a solid-lined and/or dashed-lined box) around the potential target(s)/object(s) of interest. For example, a highlighted box 520 (see FIG. 5) may be drawn around a particular person of interest while the particular person of interest is a member of a crowd of people.

Targeting module 1460, in various embodiments, is able to receive from the user a rejection 530 (e.g., a "thumbs down" in FIG. 5) or an acceptance 540 (e.g., a "thumbs up"

in FIG. 5) of the potential target(s)/object(s) of interest. When targeting module 1460 receives a rejection from the user, targeting module 1460, in one embodiment, is configured to instruct detection system 1450 to continue searching and/or locating potential targets/objects of interest that match the target profile in the sensor feed(s). Upon receiving an acceptance from the user, targeting module 1460, in one embodiment, is configured for transmitting the accepted target(s)/object(s) of interest to ATT system 1470 for tracking.

ATT system 1470 may be any device and/or system known in the art or developed in the future capable of tracking, reacquiring, following, and/or surveilling an object. In one embodiment, ATT system 1470 is configured for receiving the target(s) identified, matched, recognized, and/or verified by targeting module 1460 and tracking, following, reacquiring and/or surveilling the target(s) for a period of time. In one embodiment, the period of time is a fixed period of time. In other embodiments, the period of time is flexible and may be modified by the user or some other entity in communication with ATT system 1470.

Working in conjunction with one another, ATR system 1440, detection system 1450, targeting module 1460, and ATT system 1470 are configured for identifying (and optionally tracking) any number of targets based on the profile and/or prototype generated by target profile module 1430. In a military example, ATR system 1440, detection system 1450, targeting module 1460, and ATT system 1470 are able to identify and possibly track multiple enemy personnel and/or enemy vehicles based on the profile/prototype generated by target profile module 1430 since the enemy personnel may be wearing the same type of uniform and/or the enemy vehicles may be the same type of vehicle and/or include the same type of identifying markings. In addition, the refinement capabilities of objects and events module 1448 enables a specific enemy individual (e.g., a general) to be identified (and tracked) among multiple enemy personnel with the same uniform because the user is able to include specific personal characteristic traits of the general and/or characteristics of a general's uniform or behavior that distinguish the general from other enemy personnel. That is, objects and events module 1438 enables the user to include any distinguishing feature and/or behavior in the profile generated by target profile module 1430 and provide the distinguishing feature and/or behavior to the cooperative ATR system 1440 and/or ATT system 1470 to refine and improve target detection and tracking.

The capabilities of the various embodiments of ATR system 1440, targeting module 1460, and/or ATT system 1470 are reliant on the quality of the sensor and/or detector systems associated with ATR system 1440, targeting module 1460, and/or ATT system 1470. That is, ATR system 1440, targeting module 1460, and/or ATT system 1470 are reliant on the fidelity of the sensor and/or detectors systems and limited to the specific features that the sensor and/or detector systems are capable of detecting since system 100 is not itself improving any sensor and/or detection capabilities, but rather is using the sensor and/or detection capabilities that are currently available. In addition, in one embodiment, the capabilities of the various embodiments of ATR system 1440, targeting module 1460, and/or ATT system 1470 are additionally dependent on the type of sensors or detectors present. That is ATR system 1450, targeting module 1460, and/or ATT system 1470 are generally only capable of detecting objects or events definable by the characteristics identifiable via the sensor(s) or detector(s) used.

Figure 6:
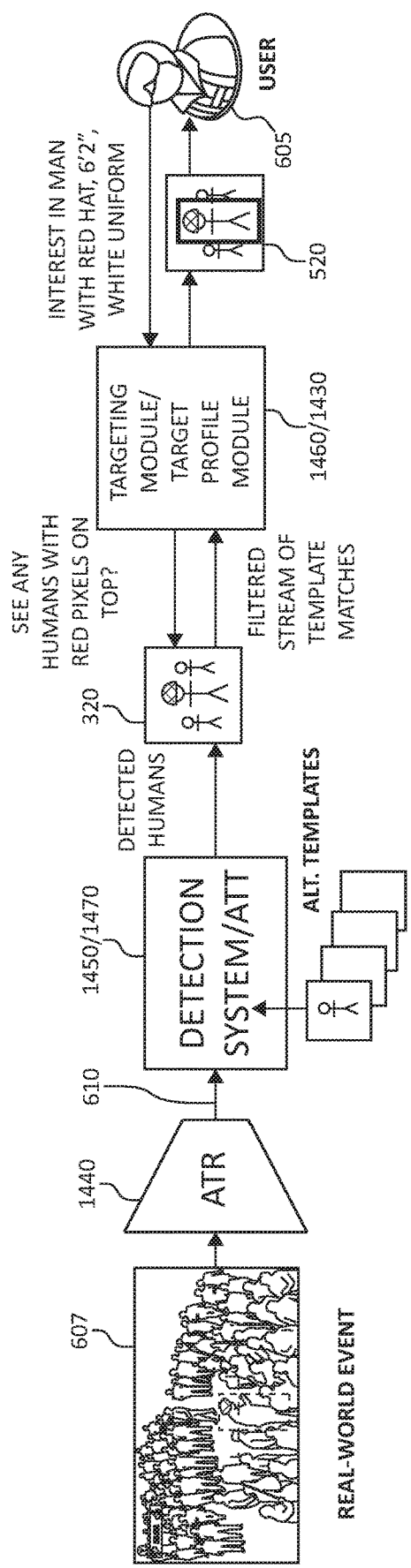
FIG. 6 is a flow diagram of an embodiment of the operation of the system of FIG. 1.

The following flow diagram of the operation of system 100 made with reference to FIG. 6, which is an example similar to the example illustrated in FIG. 3, and is provided so that a better understanding of the principles may be obtained. The following description is but one example of one embodiment of system 100 and is not intended to limit the scope of system 100 in any manner.

Target profile module 1430 (see FIG. 2) receives from the user 605 an input that the target is a 6'2" member of a group known for wearing a white uniform and the particular individual is also wearing a red hat. Objects and events module 1438 (see FIG. 2) merges this input from the user with the person 310 (see FIG. 3) that the user selected/generated from objects and events database 1434 (see FIG. 2) to generate profile 320 (see FIG. 3) of an individual with the general characteristics from objects and events database 1434 and the specific characteristics received from user 605.

ATR system 1440 records and annotates specific portions of a real-world event 607 as a sensor stream 610 (e.g., video data) and transmits sensor stream 610 to detection system 1450. Upon receipt of sensor stream 610 from ATR system 1440, detection system 1450 indicates that there are one or more persons present at location X in the sensor stream 610 from time A to time B. Detection system 1450 uses these sensor instances including the objects of interest (humans in this example) to determine if one of these humans matches or meets the more refined set of criteria that detection system 1450 can detect (e.g., relative height and the presence or non-presence of red pixels on top of a person identified in sensor stream 610). Targeting module 1460 compares the identified persons to the profile of the target person and sends one or more target candidates to user 605 for acceptance or rejection. If accepted, the target person is tracked by ATT system 1470. If rejected, in one example, targeting module 1460 instructs detection system 1450 to continue to search sensor stream 610 for possible matches to the target profile and the acceptance/rejection/tracking procedure(s) are repeated. In one example if rejected, targeting module 1460 alternatively instructs detection system 1450 to cease searching either automatically and/or via human command.

Figure 7:
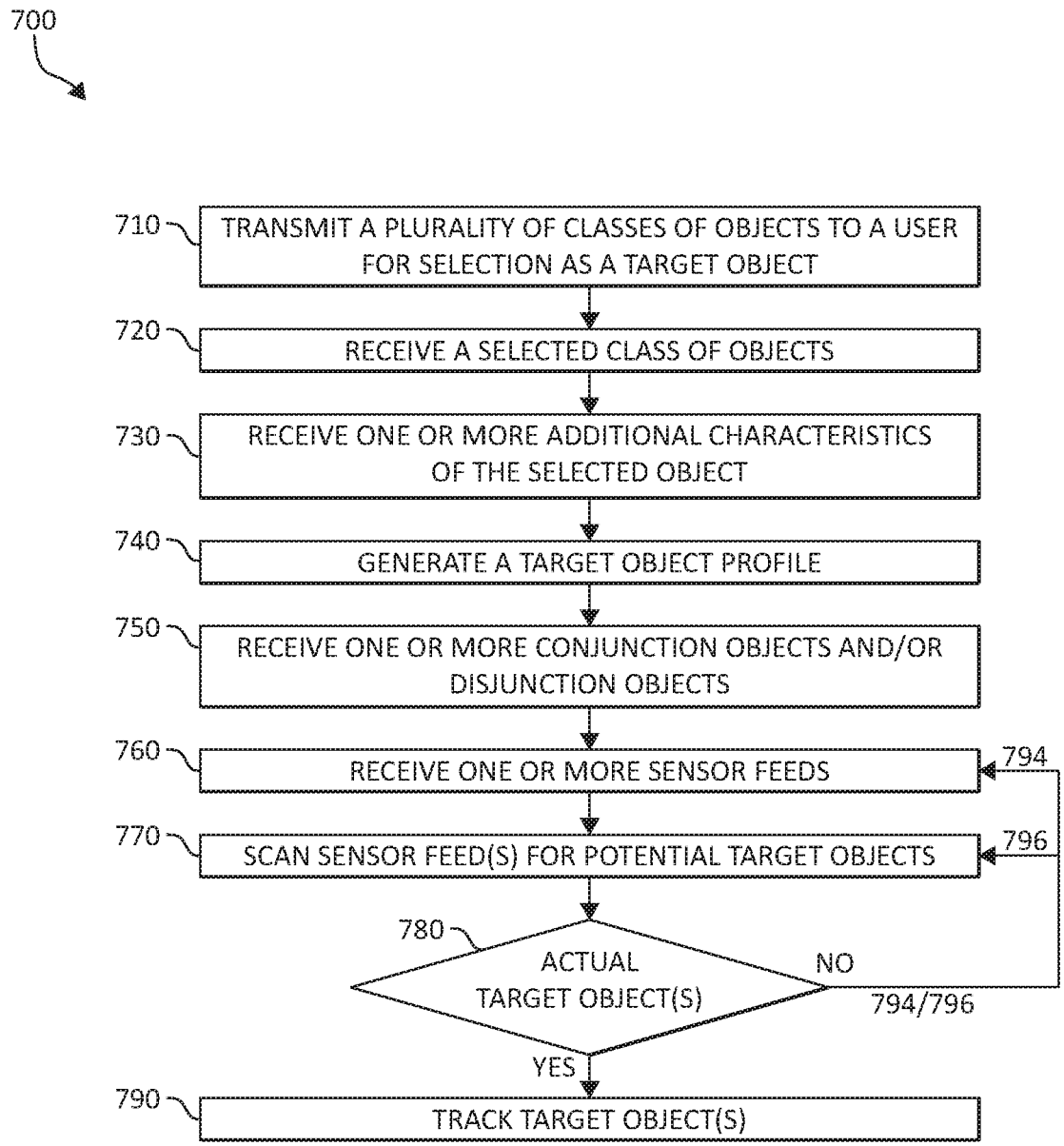
FIG. 7 is a flow diagram of one embodiment of a method for identifying and tracking one or more targets.

With reference now to FIG. 7, FIG. 7 is a flow diagram of one embodiment of a method 700 for identifying a target. At least in the illustrated embodiment, method 700 begins by a processor in a host-computing device (e.g., host-computing device 120 in FIG. 1) transmitting to a user, via a user interface (e.g., UI 110 in FIG. 1), a plurality of classes of objects stored in a database (e.g., objects and events database 1434 in FIG. 2) for selection by the user (block 710). In one embodiment, each respective class of objects comprises a generic prototype of a particular member of the class of objects and at least one class of objects includes the target.

Method 700 further comprises receiving, by the host-computing device, a selected class of objects from the user (block 720) and receiving from the user one or more additional characteristics of the target from an objects module (e.g., objects and events module 1438 in FIG. 2) (block 730). Method 700 also comprises generating, by a target profile module (e.g., target profile module 1430 in FIG. 2), a target profile (e.g., profile 320 in FIG. 3) by adding the one or more additional characteristics to the generic prototype of the selected class of objects or events (block 740). Method 700, in a further embodiment, comprises receiving, one or more conjunction objects or events and/or disjunction objects or events associated with the target and enhancing, by the hardware processor, the target profile by adding the one or more conjunction objects or events and/or disjunction objects or events to the target profile to generate a target-conjunction profile and/or a target disjunction profile (block 750).

In one embodiment, method 700 comprises receiving, from an ATR system (e.g., ATR system 1440 in FIG. 2) at a detection system (e.g., detection system 1450 in FIG. 2), one or more sensor feeds including objects identified as being in the same general class as the target (block 760) and scanning the one or more sensor feeds to identify characteristics in the identified object(s) that are similar to the target profile (block 770). In one embodiment, scanning the one or more sensor feeds to identify the target based on the target profile comprises scanning the one or more sensor feeds to identify: a person among a plurality of people, an automobile among a plurality of automobiles, a truck among a plurality of trucks, a military vehicle among a plurality of vehicles, and/or an aircraft among a plurality of aircraft. In other aspects, receiving the one or more additional characteristics of the target comprises receiving one or more visual characteristics of the target. In another aspect, scanning the one or more sensor feeds to identify the target further comprises scanning the one or more sensor feeds to identify the target based on the target conjunction profile and/or target-disjunction objects profile. In still other aspects, scanning the one or more sensor feeds to identify the target based on the target conjunction profile comprises scanning the one or more sensor feeds to identify: a person in proximity to a particular type of vehicle, a person in proximity to a particular type of people, a vehicle in a particular type of environment, a vehicle in proximity to another type of vehicle, and/or a vehicle in proximity to a type of people. In further aspects, scanning the one or more sensor feeds to identify the target based on the target-disjunction objects profile comprises scanning the one or more sensor feeds to identify: a person not in proximity to a particular type of vehicle, a person not in proximity to a particular type of people, a vehicle not in a particular type of environment, a vehicle not in proximity to another type of vehicle, and/or a vehicle not in proximity to a type of people.

Potential targets are verified by a targeting module (e.g., targeting module 1460 in FIG. 2) and transmitted to the user so that the user can accept or reject the potential targets as actual targets (block 780). The verification and transmission of potential targets as actual targets, in one embodiment, occurs sequentially (e.g., one object at a time). In other embodiments, the verification and transmission of all potential targets as actual targets occurs concurrently with one another (e.g., at the same time or at substantially the same time). These potential targets may also include a confidence indicator (e.g., a percentage match) suggestive of the degree to which each potential target matches the target profile.

If a potential target is accepted as an actual target (e.g., a "YES") method 700 can comprise tracking the movement of the target via an ATT system (e.g., ATT system 1470) (block 790). In various aspects of the embodiment, tracking the movement of the target comprises tracking the movement of the target among the plurality of objects in the selected class of objects. In other aspects, tracking the movement of the target comprises tracking movement of the identified target profile details (e.g., tracking the red hat or red pixels on the top of a person in a video stream). In another aspect, tracking comprises tracking the target even when one or more identified target profile details changes (e.g., the person changes clothing and/or removes the red hat).

In one embodiment, if each potential target is rejected as an actual target (e.g., a "NO"), method 700 comprises returning to block 760 to receive one or more additional sensor feeds and scanning the additional sensor feed(s) for more potential targets (return 794). In another embodiment, if each potential target is rejected as an actual target (e.g., a "NO"), method 700 comprises returning to block 770 and further scanning the one or more sensor feeds for potential targets (return 798). In still another embodiment, if each potential target is rejected as an actual target (e.g., a "NO"), method 700 comprises performing both return 794 and return 798 to scan one or more previous sensor feeds and one or more additional sensor feeds for potential targets (returns 794/798).

In summary, methods, systems, and computer program products for identifying a target are provided. One method comprises receiving, by a hardware processor from a sensing device in communication with the hardware processor, one or more sensor feeds comprising one or more objects that are identified as being from a same class of objects and scanning, by the hardware processor, the one or more objects to determine if a target is among the one or more objects based on a target profile. The method further comprises identifying the target if the target profile matches one or more characteristics of a particular object in the one or more objects enabling finer-grained, user-specified patterns to be identified from the patterns the sensors and detectors are configured to detect (e.g., a person with a red hat given a sensor configured to detect person, and capable of detecting red pixels at the "top" of detected persons).

In one embodiment, the method comprises presenting, by the hardware processor to a user, a plurality of classes of objects stored in a database for selection by the user, wherein each respective class of objects includes a generic prototype of an object in each class of objects and receiving, by the hardware processor, a selected object from the user. The method further comprises receiving, by the hardware processor from the user, one or more additional characteristics of the selected object and generating, by the hardware processor, the target profile by adding the one or more additional characteristics to the generic prototype of the selected object.

In another embodiment, the method comprises continuing to scan for the target if the target is not among the one or more objects. In yet another embodiment, the method comprises tracking movement of the target. In an aspect of one embodiment, the one or more objects comprise a plurality of objects that are identified as being from the same class of objects as the target and tracking the movement of the target comprises tracking the movement of the target among the plurality of objects.

In further embodiments, the method comprises receiving, by the hardware processor from the user, one or more conjunction objects associated with the target and/or one or more disjunction objects not associated with the target and enhancing the target profile by adding the conjunction object(s) and/or the disjunction object(s) to the target profile to generate a target conjunction profile and/or a target-disjunction objects profile. In one aspect, scanning the one or more sensor feeds to determine if the target is among the one or more objects further comprises scanning the one or more sensor feeds to identify the target based on the target conjunction profile and/or scanning the one or more sensor feeds to identify the target based on the target-disjunction objects profile. In an embodiment that utilizes a target conjunction profile, the method comprises scanning the one or more sensor feeds to identify the target based on a particular person in proximity to a particular type of vehicle, a particular person in proximity to a particular type of people, a particular vehicle in a particular type of environment, a particular vehicle in proximity to another type of vehicle, and/or a particular vehicle in proximity to a type of people.

A system comprises a sensing device and a hardware processor coupled to the sensing device. In various embodiments, the hardware processor is configured for receiving, from the sensing device, one or more sensor feeds comprising one or more objects that are identified as being from a same class of objects, scanning the one or more objects to determine if a target is among the one or more objects based on a target profile, and identifying the target if the target profile matches one or more characteristics of a particular object in the one or more objects.

In one embodiment, the system further comprises a user interface for receiving user inputs coupled to the hardware processor and a database storing a plurality of classes of objects coupled to the hardware processor and in which each respective class of objects includes a generic prototype of an object in each class of objects. In one aspect of this embodiment, the hardware processor is configured for presenting the plurality of classes of objects to a user for selection by the user, receiving a selected object from the user, receiving one or more additional characteristics of the selected object, and generating the target profile by adding the one or more additional characteristics to the generic prototype of the selected object.

In another embodiment, the hardware processor is configured for continuing to scan for the target if the target is not among the one or more objects. In yet another embodiment, the hardware processor is configured for tracking movement of the target. In an aspect of this embodiment, the one or more objects comprises a plurality of objects that are identified as being from the same class of objects as the target and when tracking the movement of the target the hardware processor is further configured for tracking the movement of the target among the plurality of objects.

The hardware processor, in still another embodiment, is further configured for receiving, from the user, one or more conjunction objects associated with the target and/or one or more disjunction objects not associated with the target and enhancing the target profile by adding the conjunction object(s) and/or the disjunction object(s) to the target profile to generate a target conjunction profile and/or a target-disjunction objects profile. In one aspect, scanning the one or more sensor feeds to determine if the target is among the one or more objects further comprises scanning the one or more sensor feeds to identify the target based on the target conjunction profile and/or scanning the one or more sensor feeds to identify the target based on the target-disjunction objects profile. In an embodiment that utilizes a target conjunction profile, the method comprises scanning the one or more sensor feeds to identify the target based on a particular person in proximity to a particular type of vehicle, a particular person in proximity to a particular type of people, a particular vehicle in a particular type of environment, a particular vehicle in proximity to another type of vehicle, and/or a particular vehicle in proximity to a type of people.

One computer program product comprises computer code for receiving, by a hardware processor from a sensing device in communication with the hardware processor, one or more sensor feeds comprising one or more objects that are identified as being from a same class of objects and computer code for scanning, by the hardware processor, the one or more objects to determine if a target is among the one or more objects based on a target profile. The computer program product further comprises computer code for identifying the target if the target profile matches one or more characteristics of a particular object in the one or more objects.

In one embodiment, the computer program product comprises computer code for presenting, by the hardware processor to a user, a plurality of classes of objects stored in a database for selection by the user, wherein each respective class of objects includes a generic prototype of an object in each class of objects and computer code for receiving, by the hardware processor, a selected object from the user. The computer program product further comprises computer code for receiving, by the hardware processor from the user, one or more additional characteristics of the selected object and computer code for generating, by the hardware processor, the target profile by adding the one or more additional characteristics to the generic prototype of the selected object.

In another embodiment, the computer program product comprises computer code for continuing to scan for the target if the target is not among the one or more objects. In yet another embodiment, the computer program product comprises computer code for tracking movement of the target. In an aspect of one embodiment, the one or more objects comprise a plurality of objects that are identified as being from the same class of objects as the target and the computer code for tracking the movement of the target comprises computer code for tracking the movement of the target among the plurality of objects.

In further embodiments, the computer program product comprises computer code for receiving, by the hardware processor from the user, one or more conjunction objects or events associated with the target and/or one or more disjunction objects or events not associated with the target and computer code for enhancing the target profile by adding the conjunction object(s) or event(s) and/or the disjunction object(s) or event(s) to the target profile to generate a target conjunction profile and/or a target disjunction profile. In one aspect, the computer code for scanning the one or more sensor feeds to determine if the target is among the one or more objects further comprises computer code for scanning the one or more sensor feeds to identify the target based on the target conjunction profile and/or scanning the one or more sensor feeds to identify the target based on the target disjunction profile. In an embodiment that utilizes a target conjunction profile, the computer program product comprises computer code for scanning the one or more sensor feeds to identify the target based on a particular person in proximity to a particular type of vehicle, a particular person in proximity to a particular type of people, a particular vehicle in a particular type of environment, a particular vehicle in proximity to another type of vehicle, and/or a particular vehicle in proximity to a type of people.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium such as, for example, non-transitory computer-readable signal medium or a non-transitory computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wired, optical fiber cable, infrared, etc., or any suitable combination of the foregoing. Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made through an external computer (for example, through the Internet using an Internet Service Provider).

The flowcharts and/or block diagrams in the above figures illustrate the architecture, functionality, and operation of possible implementations of systems, methods and computer program products according to various embodiments of the present invention. In this regard, each block in the flowcharts and block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the invention has been described with respect to particular embodiments, such embodiments are for illustrative purposes only and should not be considered to limit the invention. Various alternatives and changes will be apparent to those of ordinary skill in the art upon reading this application.

The invention claimed is:

1. A method for identifying a desired target, comprising:
receiving, by a hardware processor from a sensing device in communication with the hardware processor, one or more sensor feeds comprising one or more of objects or events that are identified as being from a same class of objects or events as the desired target;
scanning, by the hardware processor, the one or more objects or events to determine if the desired target is among the one or more objects or events based on a target profile; and
identifying the desired target if the target profile matches one or more characteristics of any of the one or more objects or events;
presenting, by the hardware processor to a user, a plurality of classes of objects or events stored in a database for selection by the user, wherein each respective class of objects or events includes a generic prototype of an object or event in each class of objects or events;
receiving, by the hardware processor, a selected object or event from the user;
receiving, by the hardware processor from the user, one or more additional characteristics of the selected object or event capable of being detected by the sensing device; and
generating, by the hardware processor, the target profile by adding the one or more additional characteristics to the generic prototype of the selected object or event.

2. The method of claim 1, further comprising continuing to scan for the desired target if the desired target is not among the one or more objects or events.

3. The method of claim 1, further comprising tracking movement of the desired target.

4. The method of claim 3, wherein the one or more objects or events comprises a plurality of objects or events that are identified as being from the same class of objects or events as the desired target and tracking the movement of the desired target comprises tracking the movement of the desired target among the plurality of objects or events.

5. A method for identifying a desired target, comprising:
receiving, by a hardware processor from a sensing device in communication with the hardware processor, one or more sensor feeds comprising one or more of objects or events that are identified as being from a same class of objects or events as the desired target
scanning, by the hardware processor, the one or more objects or events to determine if the desired target is among the one or more objects or events based on a target profile; and identifying the desired target if the target profile matches one or more characteristics of any of the one or more objects or events;
receiving, by the hardware processor from the user, one of:
one or more conjunction objects or events associated with the desired target, and
one or more disjunction objects or events not associated with the desired target; and
enhancing, by the hardware processor, the desired target profile by adding the one of the conjunction objects or events and the one of the disjunction objects or events to the target profile to generate one of a target conjunction profile and a target disjunction profile, wherein scanning the one or more sensor feeds to determine if the desired target is among the one or more objects or events further comprises one of:
  scanning the one or more sensor feeds to identify the desired target based on the target conjunction profile, and
  scanning the one or more sensor feeds to identify the desired target based on the target disjunction profile.

6. The method of claim 5, wherein one or more conjunction objects or events associated with the desired target are received, the target-disjunction objects or events profile is generated, and scanning the one or more sensor feeds to determine if the desired target is among the one or more objects or events further comprises scanning the one or more sensor feeds to identify the desired target based on at least one of:
  a particular person in proximity to a particular type of vehicle;
  a particular person in proximity to a particular type of people;
  a particular vehicle in a particular type of environment;
  a particular vehicle in proximity to another type of vehicle; and
  a particular vehicle in proximity to a type of people.

7. The method of claim 5, wherein one or more conjunction objects or events associated with the desired target are received and collectively define a behavior of the target where the target is a person or group of persons, the target-disjunction objects or events profile is generated, and scanning the one or more sensor feeds to determine if the desired target is among the one or more objects or events further comprises scanning the one or more sensor feeds to identify the desired target based on identification of the behavior of the target.

8. A system for identifying a desired target, comprising:
  a sensing device; and
  a hardware processor coupled to the sensing device, wherein the hardware processor is configured for:
    receiving, from the sensing device, one or more sensor feeds comprising one or more objects that are identified as being from a same class of objects,
    scanning the one or more sensor feeds to determine if a desired target is among the one or more objects based on a desired target profile, and
    identifying the desired target if the target profile matches one or more characteristics of a particular object in the one or more objects;
  a user interface for receiving user inputs coupled to the hardware processor; and
  a database storing a plurality of classes of objects coupled to the hardware processor and in which each respective class of objects includes a generic prototype of an object in each class of objects, wherein the hardware processor is further configured for:
    presenting the plurality of classes of objects to a user for selection by the user,
    receiving a selected object from the user,
    receiving one or more additional characteristics of the selected object, and
    generating the target profile by adding the one or more additional characteristics to the generic prototype of the selected object.

9. The system of claim 8, wherein the hardware processor is further configured for continuing to scan for the desired target if the desired target is not among the one or more objects.

10. The system of claim 8, wherein the hardware processor is further configured for tracking movement of the desired target.

11. The system of claim 10, wherein the one or more objects comprises a plurality of objects that are identified as being from the same class of objects as the desired target and when tracking the movement of the desired target the hardware processor is further configured for tracking the movement of the desired target among the plurality of objects.

12. A system for identifying a desired target, comprising:
  a sensing device; and
  a hardware processor coupled to the sensing device, wherein the hardware processor is configured for:
    receiving, from the sensing device, one or more sensor feeds comprising one or more objects that are identified as being from a same class of objects,
    scanning the one or more sensor feeds to determine if a desired target is among the one or more objects based on a desired target profile, and
    identifying the desired target if the target profile matches one or more characteristics of a particular object in the one or more objects,
    receiving, from the user, one of:
      one or more conjunction objects associated with the desired target, and
      one or more disjunction objects not associated with the desired target; and
    enhancing the target profile by adding the one of the conjunction objects and the one of the disjunction objects to the target profile to generate one of a target conjunction profile and a target disjunction profile,
  wherein scanning the one or more sensor feeds to determine if the desired target is among the one or more objects further comprises one of:
    scanning the one or more sensor feeds to identify the desired target based on the target conjunction profile, and
    scanning the one or more sensor feeds to identify the target based on the target disjunction profile.

13. The system of claim 12, wherein one or more conjunction objects associated with the desired target are received, the target disjunction profile is generated, and when scanning the one or more sensor feeds to determine if the desired target is among the one or more objects hardware processor is further configured for scanning the one or more sensor feeds to identify the desired target based on at least one of:
  a particular person in proximity to a particular type of vehicle;
  a particular person in proximity to a particular type of people;
  a particular vehicle in a particular type of environment;
  a particular vehicle in proximity to another type of vehicle; and
  a particular vehicle in proximity to a type of people.

14. The system of claim 12, wherein one or more conjunction objects or events associated with the desired target are received and collectively define a behavior of the target where the target is a person or group of persons, the target-disjunction objects or events profile is generated, and scanning the one or more sensor feeds to determine if the desired target is among the one or more objects or events further comprises scanning the one or more sensor feeds to identify the desired target based on identification of the behavior of the target.

15. A non-transitory computer-readable storage medium including a computer program product for identifying a desired target, comprising:
- computer code for receiving, by a hardware processor from a sensing device in communication with the hardware processor, one or more sensor feeds comprising one or more objects that are identified as being from a same class of objects;
- computer code for scanning, by the hardware processor, the one or more objects to determine if a desired target is among the one or more objects based on a target profile; and
- computer code for identifying the desired target if the target profile matches one or more characteristics of a particular object in the one or more objects;
- computer code for presenting, by the hardware processor to a user, a plurality of classes of objects stored in a database for selection by the user, wherein each respective class of objects includes a generic prototype of an object in each class of objects;
- computer code for receiving, by the hardware processor, a selected object from the user;
- computer code for receiving, by the hardware processor from the user, one or more additional characteristics of the selected object; and
- computer code for generating, by the hardware processor, the target profile by adding the one or more additional characteristics to the generic prototype of the selected object.

16. The computer-readable storage medium of claim 15, further comprising computer code for continuing to scan for the desired target if the desired target is not among the one or more objects.

17. The computer-readable storage medium of claim 15, further comprising computer code for tracking movement of the desired target.

18. The computer-readable storage medium of claim 17, wherein the one or more objects comprises a plurality of objects that are identified as being from the same class of objects as the desired target and the computer code for tracking the movement of the desired target comprises computer code for tracking the movement of the desired target among the plurality of objects.

19. A non-transitory computer-readable storage medium including a computer program product for identifying a desired target, comprising:
- computer code for receiving, by a hardware processor from a sensing device in communication with the hardware processor, one or more sensor feeds comprising one or more objects that are identified as being from a same class of objects;
- computer code for scanning, by the hardware processor, the one or more objects to determine if a desired target is among the one or more objects based on a target profile; and
- computer code for identifying the desired target if the target profile matches one or more characteristics of a particular object in the one or more objects;
- computer code for receiving, by the hardware processor from the user, one of:
  - one or more conjunction objects associated with the desired target, and
  - one or more disjunction objects not associated with the desired target; and
- computer code for enhancing, by the hardware processor, the desired target profile by adding the one of the conjunction objects and the one of the disjunction objects to the desired target profile to generate one of a target conjunction profile and a target disjunction profile;
- wherein the computer code for computer code for scanning the one or more sensor feeds to determine if the desired target is among the one or more objects further comprises one of:
  - computer code for scanning the one or more sensor feeds to identify the desired target based on the target conjunction profile, and
  - computer code for scanning the one or more sensor feeds to identify the target based on the target disjunction profile.

* * * * *